(12) United States Patent
Tang et al.

(10) Patent No.: US 10,550,575 B2
(45) Date of Patent: Feb. 4, 2020

(54) BONDING ADHESIVE AND ADHERED ROOFING SYSTEMS PREPARED USING THE SAME

(71) Applicant: FIRESTONE BUILDING PRODUCTS CO., LLC, Indianapolis, IN (US)

(72) Inventors: Jiansheng Tang, Westfield, IN (US); Joseph Carr, Indianapolis, IN (US)

(73) Assignee: Firestone Building Products Company, LLC, Nashville, TN (US)

( * ) Notice: Subject to any disclaimer, the term of this patent is extended or adjusted under 35 U.S.C. 154(b) by 80 days.

(21) Appl. No.: 15/226,243

(22) Filed: Aug. 2, 2016

(65) Prior Publication Data

US 2016/0340905 A1 Nov. 24, 2016

Related U.S. Application Data

(63) Continuation of application No. 14/215,344, filed on Mar. 17, 2014.

(60) Provisional application No. 61/786,794, filed on Mar. 15, 2013.

(51) Int. Cl.

| | | |
|---|---|---|
| *C08L 83/06* | (2006.01) | |
| *E04D 5/14* | (2006.01) | |
| *C09J 109/00* | (2006.01) | |
| *E04D 11/00* | (2006.01) | |
| *C09J 175/04* | (2006.01) | |
| *C08G 65/336* | (2006.01) | |
| *C09D 171/02* | (2006.01) | |
| *C09J 171/00* | (2006.01) | |
| *E04D 3/36* | (2006.01) | |
| *E04D 7/00* | (2006.01) | |
| *B32B 7/12* | (2006.01) | |
| *B32B 11/04* | (2006.01) | |
| *B32B 25/16* | (2006.01) | |
| *B32B 37/12* | (2006.01) | |
| *C09J 5/00* | (2006.01) | |
| *C09J 201/02* | (2006.01) | |
| *C09J 201/10* | (2006.01) | |
| *E04D 5/08* | (2006.01) | |
| *E04D 11/02* | (2006.01) | |
| *E04D 12/00* | (2006.01) | |
| *E04D 15/04* | (2006.01) | |

(52) U.S. Cl.
CPC ............ *E04D 5/148* (2013.01); *B32B 7/12* (2013.01); *B32B 11/044* (2013.01); *B32B 25/16* (2013.01); *B32B 37/12* (2013.01); *C08G 65/336* (2013.01); *C09D 171/02* (2013.01); *C09J 5/00* (2013.01); *C09J 109/00* (2013.01); *C09J 171/00* (2013.01); *C09J 175/04* (2013.01); *C09J 201/02* (2013.01); *C09J 201/10* (2013.01); *E04D 3/36* (2013.01); *E04D 5/08* (2013.01); *E04D 7/005* (2013.01); *E04D 11/00* (2013.01); *E04D 11/02* (2013.01); *E04D 12/00* (2013.01); *B32B 2255/26* (2013.01); *B32B 2307/728* (2013.01); *B32B 2319/00* (2013.01); *B32B 2395/00* (2013.01); *B32B 2419/06* (2013.01); *C09J 2499/00* (2013.01); *E04D 2015/042* (2013.01)

(58) Field of Classification Search
CPC .......... E04D 5/148; C08L 57/00; C08L 57/02; C08L 71/02; C08L 71/00; C08L 75/04; C08L 101/12; C08L 101/95; C08L 101/00
See application file for complete search history.

(56) References Cited

U.S. PATENT DOCUMENTS

| | | | |
|---|---|---|---|
| 4,657,958 A | 4/1987 | Fieldhouse et al. | |
| 4,732,925 A | 3/1988 | Davis | |
| 4,778,852 A | 10/1988 | Futamura | |
| 4,810,565 A | 3/1989 | Wasitis et al. | |
| 5,389,715 A | 2/1995 | Davis et al. | |
| 5,849,133 A | 12/1998 | Senderling et al. | |
| 6,101,767 A | 8/2000 | Georgeau | |
| 6,120,869 A | 9/2000 | Cotsakis et al. | |
| 6,183,551 B1 | 2/2001 | Okamoto et al. | |
| 6,502,360 B2 | 1/2003 | Carr, III et al. | |
| 6,505,455 B1 | 1/2003 | Georgeau | |
| 6,679,018 B2 * | 1/2004 | Georgeau | E04D 5/12 52/408 |
| 6,803,412 B2 | 10/2004 | Nguyen-Misra et al. | |
| 7,175,732 B2 | 2/2007 | Robison et al. | |
| 7,189,781 B2 | 3/2007 | Acevedo et al. | |
| 7,767,308 B2 | 8/2010 | Georgeau et al. | |
| 7,772,301 B2 * | 8/2010 | Fensel | C09J 195/00 524/59 |
| 2004/0214950 A1 * | 10/2004 | Nakamura | C08L 53/025 525/88 |

(Continued)

FOREIGN PATENT DOCUMENTS

| | | |
|---|---|---|
| EP | 1 462 500 A1 | 9/2004 |
| JP | 2009-029972 A | 2/2009 |

(Continued)

OTHER PUBLICATIONS

Kristalex 3100 hydrocarbon resin data sheet, Eastman Chemical Company, 2019. (Year: 2019).*

(Continued)

*Primary Examiner* — Margaret G Moore
(74) *Attorney, Agent, or Firm* — Brian D. McAlhaney; Arthur M. Reginelli

(57) ABSTRACT

A bond adhesive composition comprising a polymer having a silicon-containing hydrolyzable terminal group and a hydrocarbon resin, where the composition is substantially devoid of phenolic resin.

26 Claims, 1 Drawing Sheet

(56) References Cited

U.S. PATENT DOCUMENTS

| | | | |
|---|---|---|---|
| 2005/0107499 A1* | 5/2005 | Georgeau | B32B 11/02 524/59 |
| 2007/0282080 A1 | 12/2007 | Kawakami et al. | |
| 2008/0292902 A1* | 11/2008 | Reid | C08G 18/12 428/626 |
| 2009/0318599 A1 | 12/2009 | Broikamp | |
| 2010/0317796 A1 | 12/2010 | Huang et al. | |
| 2012/0040191 A1 | 2/2012 | Kohl et al. | |
| 2012/0123016 A1 | 5/2012 | Bolte et al. | |
| 2015/0284610 A1 | 10/2015 | Zander et al. | |
| 2016/0032158 A1 | 2/2016 | Tang et al. | |
| 2016/0340905 A1 | 11/2016 | Tang et al. | |
| 2016/0362893 A1 | 12/2016 | Tang et al. | |

FOREIGN PATENT DOCUMENTS

| | | |
|---|---|---|
| JP | 2010-106159 A | 5/2010 |
| WO | 2014145482 A2 | 9/2014 |
| WO | 2015074031 A1 | 5/2015 |

OTHER PUBLICATIONS

Advisory Action issued by USPTO for U.S. Appl. No. 14/215,344 dated Sep. 28, 2017.
Response filed with USPTO for U.S. Appl. No. 14/215,344 dated Sep. 19, 2017.
Final Rejection issued by USPTO for U.S. Appl. No. 14/215,344 dated Jul. 10, 2017.
Response filed with USPTO for U.S. Appl. No. 14/215,344 dated Jun. 19, 2017.
Non-Final Rejection issued by USPTO for U.S. Appl. No. 14/215,344 dated Jan. 18, 2017.
Advisory Action issued by USPTO for U.S. Appl. No. 14/215,344 dated Aug. 11, 2016.
Response filed with USPTO for U.S. Appl. No. 14/215,344 dated Aug. 2, 2016.
Final Rejection issued by USPTO for U.S. Appl. No. 14/215,344 dated May 2, 2016.
Response filed with USPTO for U.S. Appl. No. 14/215,344, filed Apr. 4, 2016.
Non-Final Rejection issued by USPTO for U.S. Appl. No. 14/215,344, filed Dec. 3, 2015.
Non-Final Rejection issued by USPTO for U.S. Appl. No. 14/776,791 dated Jul. 10, 2017.
Advisory Action issued by USPTO for U.S. Appl. No. 14/776,791 dated Feb. 24, 2017.
Response filed with for USPTO for U.S. Appl. No. 14/776,791 dated Feb. 9, 2017.
Final Rejection issued by USPTO for U.S. Appl. No. 14/776,791 dated Dec. 7, 2016.
Response filed with USPTO for U.S. Appl. No. 14/776,791 dated Aug. 25, 2016.
Non-final Rejection issued by USPTO for U.S. Appl. No. 14/776,791 dated May 25, 2016.
International Search Report for Application No. PCT/US2014/030257 dated Sep. 17, 2014.

\* cited by examiner

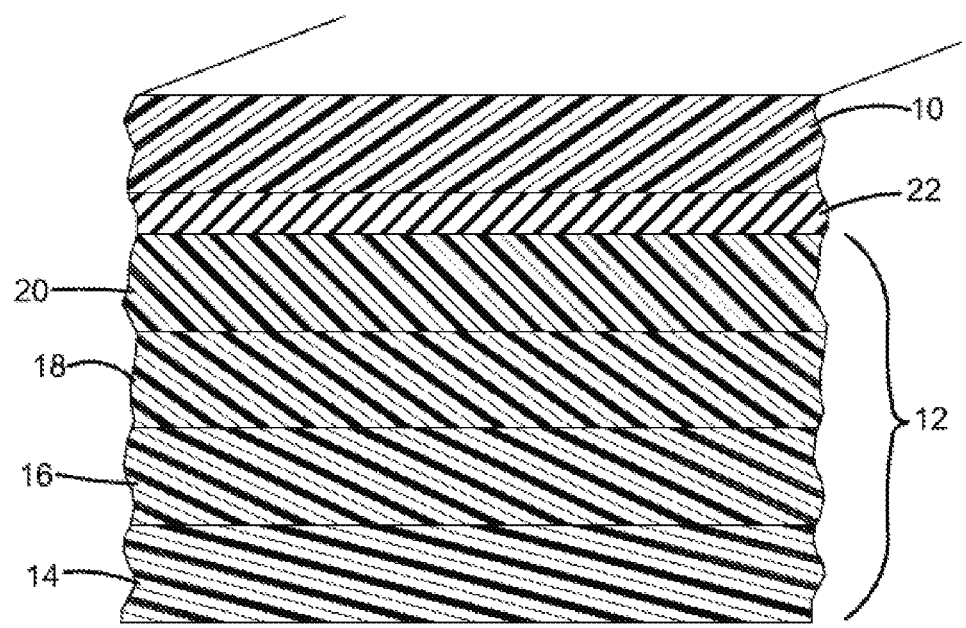

BONDING ADHESIVE AND ADHERED ROOFING SYSTEMS PREPARED USING THE SAME

This application is a continuation of U.S. patent application Ser. No. 14/215,344, filed Mar. 17, 2014, which claims the benefit of U.S. Provisional Application Ser. No. 61/786,794, filed Mar. 15, 2013, which are incorporated herein by reference.

FIELD OF THE INVENTION

Embodiments in the invention are directed toward a silicon-containing bonding adhesive and adhered roofing systems prepared with the adhesive.

BACKGROUND OF THE INVENTION

Polymeric membranes, such as cured sheets of ethylene-propylene-diene copolymer rubber (EPDM) or extruded sheet of thermoplastic olefins (TPO), are often used in the construction industry to cover flat or low-sloped roofs. These membranes, which may also be referred to as panels, are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may include a variety of materials depending on the situation. For example, the surface may be a concrete, metal, or wood deck, it may include insulation or recover board, and/or it may include an existing membrane.

In addition to securing the membrane to the roof—which mode of attachment primary seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water-resistant seal.

Thus, there are two modes of membrane attachment that are used in conjunction. The first seeks to anchor the membrane to the roof, while the second seeks to create a water-impervious barrier by attaching individual adjacent membrane panels to each other or to flashing. Inasmuch as these modes of membrane attachment seek entirely different goals, the mechanisms by which they operate are likewise distinct.

Adhesive attachment is typically employed to form adhered roofing systems. The membrane may be adhered to the roof substrate substantially across the entire planar surface of the membrane to form fully-adhered systems. In other words, a majority, if not all, of the membrane panel is secured to the roof substrate as opposed to mechanical attachment methods which can only achieve direct attachment in those locations where a mechanical fastener actually affixes the membrane. Fully-adhered roofing systems are advantageously installed where maximum wind uplift prevention is desired. Also, fully-adhered systems are desirable in re-roofing situations, especially where the new membrane is placed over an existing membrane (a technique that is commonly referred to as re-skinning).

Several techniques are employed to prepare fully-adhered roofing systems. One technique includes the use of a fleece-backed EPDM membrane that is secured to the substrate by using a low-rise polyurethane foam adhesive that is sprayed over the substrate. Once the adhesive polyurethane foam is applied, the fleece-backed membrane is applied to the adhesive layer, which attaches itself to the fleece backing. Alternatively, nitrile-based bond adhesives can be applied to the substrate and the fleece-backed EPDM membrane can be secured thereto. Because these systems require fleece-backed membranes, they are expensive and suffer from manufacturing inefficiencies relating to the need to secure the fleece to the membrane.

Other techniques employ conventional EPDM membrane sheet, which is not modified with a fleece backing. In these situations, it is common to employ a contact bonding method whereby technicians coat both the membrane and the substrate that receives the membrane with an adhesive. The adhesive is then typically allowed to at least partially set to, among other things, build some wet green strength. The membrane is then mated with the substrate via the partially-set adhesive. Because the volatile components (e.g. solvent) of the adhesives are "flashed off" prior to mating, good, early (green) bond strength can advantageously be developed.

One technique employs a water-borne bond adhesive that is applied to the substrate and then the EPDM membrane can be applied to the adhesive layer. While this attachment technique has proven useful, the use is generally limited to ambient weather conditions (e.g. greater than 40° C.) and/or in conjunction with porous substrates that absorb water thereby allowing the adhesive to dry or cure without blistering the membrane.

In other situations, solvent-based adhesives are employed, such as polychloroprene-based bond adhesives. While the use of known solvent-based adhesives has proven versatile to the extent that the substrate need not be porous and cold-weather application is feasible, the technique requires application of the adhesive to both the substrate and the membrane, followed by a time delay to allow the solvent to flash off, and then a mating of the two adhesive surfaces (i.e., the adhesive coated membrane is mated to the adhesive coated substrate).

In yet other situations, 100% solids bond adhesives are employed. For example, U.S. Pat. No. 7,767,308 teaches a moisture-curable bond adhesive that includes a polymer or a combination of polymers having silicon-containing hydrolyzable terminal groups, a phenolic resin, and a non-polymeric silicon-containing hydrolyzable compound. While these bond adhesives are touted for being free of volatile organic compounds (VOCs), safe for chronic exposure, and non-flammable, and yet provide a high initial peel strength and/or high peel strength upon being fully cured between a roof substrate and a rubber membrane, it would nonetheless be desirable to formulate a bond adhesive that does not include a phenolic resin.

While both solvent-based and water-based adhesives may be used as contact adhesives, solvent-based bonding adhesives offer advantages. For example, the flash-off period, which is the time required to allow solvent evaporation prior to mating, can be between 5 and 40 minutes, and is less susceptible to environmental conditions, such as temperature, than water-based adhesive systems. Solvent-based systems, on the other hand, can be problematic. For example, the solvent employed in the system can cause membrane swelling and/or blistering. It is believed swelling and blistering results from solvent compatibility with the membrane and/or a component of the membrane. Other problems can include blushing, which is the formation of condensation on the surface of the film formed upon application of the adhesive to the membrane. Blushing can have a deleterious impact on the bond strength and/or quality of the bond formed by the adhesive and is therefore not desirable.

The evaporation of solvents can be problematic, especially as the desire to minimize release of volatile organic compounds increases. Thus, both water-borne and solvent-borne systems known in the art today have limitations, and there is therefore a desire for a bond adhesive that overcomes these advantages.

SUMMARY OF THE INVENTION

One or more embodiments of the present invention provide a bond adhesive composition comprising a polymer having a silicon-containing hydrolyzable terminal group and a hydrocarbon resin, where the composition is substantially devoid of phenolic resin.

One or more embodiments of the present invention provide a method for forming an adhered membrane roof system, the method comprising applying a bond adhesive to a substrate on a roof to form an adhesive layer, where the bond adhesive includes a polymer having a silicon-containing hydrolyzable terminal group and a hydrocarbon resin devoid of phenolic resin and applying a membrane directly to the adhesive layer.

BRIEF DESCRIPTION OF THE DRAWINGS

The FIGURE is a cross sectional view of a roofing system including EPDM membrane adhered to a substrate using an adhesive according to one or more embodiments of the present invention.

DETAILED DESCRIPTION OF ILLUSTRATIVE EMBODIMENTS

Embodiments of the invention are based, at least in part, on the discovery of a bond adhesive that includes a polymer having silicon-containing hydrolyzable terminal group and a hydrocarbon resin. These bond adhesives are advantageously devoid or substantially devoid of phenolic resins. In one or more embodiments, these bond adhesive compositions can be used to bond polymeric substrates (e.g. roofing membranes) to other substrates (e.g., isocyanate construction boards). And, these membranes need not be fleece-backed membranes. Indeed, fully-adhered systems that advantageously meet FM 4470/4474 standards for wind uplift can be prepared in the absence of a fleece backing. Moreover, it has been unexpectedly discovered that these adhered systems can be mated to a variety of substrates including existing membranes, which thereby provides a unique method for re-roofing or re-skinning an existing roof.

Adhesive Composition

As discussed above, the adhesive compositions of this invention include a polymer having silicon-containing a hydrolyzable terminal group and a hydrocarbon resin. In addition, the adhesive compositions may include an adhesion promoter, a filler, a catalyst, an antioxidant, a stabilizer, a moisture scavenger, a crosslink inhibitor (a.k.a retarder), and/or a thixotropic compound. In one or more embodiments, the adhesive composition is a 100% solids composition (i.e. it is solvent free), and the composition is devoid or substantially devoid of a phenolic resin.

Silane-Terminated Polymers

In one or more embodiments, the polymer having silicon-containing hydrolyzable terminal group may include a silane-terminated polymer, which may also be referred to as silyl-terminated polymer. The term "silicon-containing hydrolyzable terminal group" as used herein means a group wherein at least one silicon atom is combined with a hydrolyzable group, such as a methoxy group, which is subject to hydrolysis and polymerization by moisture.

The backbone of the polymer having silicon-containing hydrolyzable terminal groups may be comprised of polyethers, polyesters, polyurethanes (SPUR), or other suitable backbones.

Suitable polymers having silicon-containing hydrolyzable terminal groups are commercially available and/or can be prepared in accordance with techniques known in the art. Examples of suitable commercially available polymers having silicon-containing hydrolyzable terminal groups are Geniosil™ STP-E 35 trimethoxysilylpropyl-carbamate-terminated polyether, and Geniosil™ STP-E 30 silane-terminated polyether with dimethoxy(methyl)silylmethylcarbamate terminal groups, both of which are available from Wacker Chemical. Another commercially available polymer having silicon-containing hydrolyzable terminal groups that may be employed in the adhesive compositions of this invention is "SPUR+" silane-terminated polyurethanes, which are available from Momentive. Another suitable commercially available material is "MS" silyl-terminated polyether (S227H, S303, S327, S303H, SAX350), which are available from Kaneka.

Hydrocarbon Resin

As mentioned above, the adhesive composition may include one or more hydrocarbon resins. In one or more embodiments, the hydrocarbon resins may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer include styrene, indene, derivatives of styrene, derivatives of indene, and combinations thereof.

In one or more embodiments, examples of hydrocarbon resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In certain embodiments, the synthetic aliphatic or aromatic hydrocarbon resins may be characterized by a number average molecular weight ($M_n$) of from about 300 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer. In particular embodiments, the dicyclopentadiene tackifier resin is hydrogenated. Hydrogenated dicyclopentadiene tackifier resins are commercially available from Neville.

In one or more embodiments, synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized.

The hydrocarbon resins may be characterized by an aromatic content of from about 1 to about 60, in other embodiments from about 2 to about 40, and in other embodiments from about 5 to about 10. In one or more embodiments, the tackifier resins are hydrogenated or partially hydrogenated; useful resins include those that are at least 50 percent, in other embodiments at least 80 percent, in other embodiments at least 95 percent, and in other embodiments at least 99 percent or fully hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the hydrocarbon resin may be characterized by a softening point of from about 5° C. to about 210° C., in other embodiments from about 65° C. to about 170° C., and in other embodiments from about 90° C. to about 140° C. Softening point can be determined according to ASTM E-28 (Revision 1996). In particular embodiments, especially where a propylene copolymer is employed, at least one tackifier resin is employed that is characterized by a softening point of less than 120° C., in other embodiments less than 110° C., and in other embodiments less than 107° C.; this tackifier resin, which may be referred to as a low-softening point tackifier resin, may have a softening point from 90° C. to 120° C., in other embodiments from 95° C. to 110° C., and in other embodiments from 100° C. to 107° C. In certain embodiments, the low-softening point tackifier resin may be used in conjunction with a second tackifier resin having a higher softening point. The second tackifier resin, which may be referred to as a high-softening point tackifier resin, may be characterized by having a softening point in excess of 120° C., in other embodiments in excess of 125° C., and in other embodiments in excess of 130° C.; this high-softening point tackifier resin may have a softening point of from 120° C. to 150° C., in other embodiments from 125° C. to 145° C., and in other embodiments from 130° C. to 137° C.

In these or other embodiments, the hydrocarbon resin may be characterized by a glass transition temperature of less than 120° C., in other embodiments less than 110° C., and in other embodiment from about −40° C. to about 80° C. Glass transition temperature may be determined according to ASTM D 341-88 by using differential scanning calorimetry.

In these or other embodiments, the hydrocarbon resin may be characterized by a Saponification number (mg KOH/g resin material) of greater than 10, in other embodiments greater than 15, and in other embodiments greater than 19.

In these or other embodiments, the hydrocarbon resin may be characterized by an acid number greater than 10, in other embodiments greater than 15, and in other embodiments greater than 20, and in other embodiments greater than 25.

Adhesion Promoter

In one or more embodiments, the adhesion promoter includes a non-polymeric silicon-containing hydrocarbon compound that has a lower molecular weight than the polymer having a silicon-containing hydrolysable group (i.e. the silane-terminate polymer). Also, the adhesion promoter includes at least one hydrolyzable group capable of reacting with a hydrolyzed functional group on the polymer having silicon-containing hydrolyzable terminal groups, and includes at least one moiety capable of interacting (i.e., promoting adhesion) with materials that are to be bonded with one another (such as a rubber membrane material). The expression non-polymeric, as used to modify the silicon-containing hydrocarbon compound is meant to exclude polymers and copolymers having at least 10 repeat units or monomeric units, such as urethane prepolymers having silicon-containing hydrolyzable terminal groups, but is meant to encompass oligomeric silicon-containing hydrolyzable compounds having fewer than 10 repeat units or monomers, and which are useful for promoting adhesion between a substrate and a cured adhesive composition. Examples of suitable aminosilane adhesion promoters that may function as the non-polymeric silicon-containing hydrolyzable compound include, but are not limited to gamma-aminopropyltrimethoxysilane, gamma-aminopropyltriethoxysilane, gamma-(aminoethyl)-aminopropyltrimethoxy-silane, methylaminopropyldimethoxysilane, methyl-gamma-(aminoethyl)-aminopropyldimethoxysilane, gamma-dimethylaminopropyltrimethoxysilane, and the like.

Plasticizers

In one or more embodiments, plasticizers that may optionally be employed in the adhesive compositions of this invention. In or more embodiments, plasticizers include propylene glycol dibenzoate, diisononyl phthalate, and soy methyl esters, Mesamol II, HB-40, butylbenzylphthalate. In one or more embodiments, the plasticizers may include high boiling solvents that promote tackification, lowering of viscosity, and sprayability.

Moisture Scavenger

In one or more embodiments, a moisture scavenger is employed in the adhesive compositions of this invention. Moisture scavengers that may be employed include chemical moisture scavengers and physical moisture scavengers that absorb and/or adsorb moisture. In particular embodiments, the chemical moisture scavenger is vinyl-trimethoxysilane, which may be employed in an amount of up to about 3% by weight based on the total weight of the adhesive composition. An example of a physical moisture scavenger that may be employed is 3 A Sieves from UOP, which is a zeolite having 3 Angstrom pores capable of trapping moisture. Other moisture scavengers that may be employed include oxazoladines and calcium oxide.

Thixatrope

In one or more embodiments, a thixatrope, which may also be referred to as a thixatropic compound, may be employed. Suitable thixatropes include polyamide waxes, such as "Crayvallac SLX" available from Arkema, or polymerized castor oils such as Flowtone R from Crayvalley.

Antioxidants

Antioxidants that may be employed if desired. Examples of useful antioxidants include hindered phenols and phosphate esters.

Fillers

Generally, any compatible filler, such as calcium carbonate may be employed if desired for a particular application. As the skilled person will appreciate, fillers will generally be omitted when the adhesive composition is intended to be sprayed onto one surface that is subsequently applied to a second surface on which the adhesive is or is not deposited.

Catalyst

As mentioned above, the adhesive composition may include one or more catalysts for the purpose of promoting the crosslinking the silane-terminated polymer. Without wishing to be bound by any particular theory, it is believed that these catalysts promote the hydrolysis and condensation of organosilicon compounds (i.e., reactions between the terminal groups of the polymer having silicon-containing hydrolyzable terminal groups, and reactions between the optional adhesion promoter when present and the polymer having silicon-containing hydrolyzable terminal groups). In one or more embodiments, hydrolysis of organosilicon compounds may be catalyzed by either acids or bases. Useful basic catalysts that may be employed in the compositions of this invention include alkali metal hydroxides such as potassium hydroxide, silanolates such as lithium silanolate, organic amines, and Lewis bases such as alkali metal carbonates and bicarbonates. Suitable acid catalysts include mineral acids such as sulfuric and phosphoric acids, organic acids such as acetic, propanoic and methane sulfonic acids. Other suitable acid catalysts include Lewis acids such as aluminum chloride, organotin compounds such as dibutyl tin dilaurate and titanium compounds such as the alkyl ortho esters, including tetrabutyl titanate.

Phenolic Resin

As mentioned above, the adhesive composition is devoid or substantially devoid of a phenolic resin. As used herein, the term phenolic resin refers to a phenol-formaldehyde resin. For example, the term phenolic resin may include a novolac resin, which is a phenol-formaldehyde resin where the molar ratio of the formaldehyde to phenol is less than one. These resins are typically synthesized by using an acid catalyst. The term phenolic resin also refers resol resins wherein the molar ratio of the formaldehyde to phenol is greater than one. These resins are typically synthesized by using a base catalyst.

Solvent

As mentioned above, the adhesive composition is devoid or substantially devoid of a solvent. As used herein, the term solvent refers to a volatile liquid that is either a VOC or VOC exemption liquid. Examples of solvents that are excluded include toluene and acetone.

Amounts

Silane-Terminated Polymer

In one or more embodiments, the adhesive compositions of the invention include at least 25 wt %, in other embodiments at least 30%, and in other embodiments at least 35 wt. % silane-terminated polymer. In these or other embodiments, the adhesive compositions of the invention include at most 80%, in other embodiments at most 75%, and in other embodiments at most 70% wt. % silane-terminated polymer. In one or more embodiments, the adhesive compositions of the invention include from about 25% to about 80%, in other embodiments from about 30% to about 75%, and in other embodiments from about 35% to about 70% wt. % silane-terminate polymer.

Hydrocarbon Resin

In one or more embodiments, the adhesive compositions of the invention include at least 1%, in other embodiments at least 3%, and in other embodiments at least 5% wt. % hydrocarbon. In these or other embodiments, the adhesive compositions of the invention include at most 30%, in other embodiments at most 25%, and in other embodiments at most 20% wt. % hydrocarbon. In one or more embodiments, the adhesive compositions of the invention include from about 1% to about 30%, in other embodiments from about 3% to about 25%, and in other embodiments from about 5% to about 20% wt. % hydrocarbon.

Adhesion Promoters

In one or more embodiments, the adhesive compositions of the invention include at least 1%, in other embodiments at least 1.5%, and in other embodiments at least 2% wt. % adhesion promoter. In these or other embodiments, the adhesive compositions of the invention include at most 10%, in other embodiments at most 9%, and in other embodiments at most 8% wt. % adhesion promoter. In one or more embodiments, the adhesive compositions of the invention include from about 1% to about 10%, in other embodiments from about 1.5% to about 9%, and in other embodiments from about 2% to about 8% wt. % adhesion promoter.

Catalyst

In one or more embodiments, the adhesive compositions of the invention include at least 0.05%, in other embodiments at least 0.1%, and in other embodiments at least 0.15 wt. % catalyst. In these or other embodiments, the adhesive compositions of the invention include at most 3%, in other embodiments at most 2.5%, and in other embodiments at most 2% wt. % catalyst. In one or more embodiments, the adhesive compositions of the invention include from about 0.05% to about 3%, in other embodiments from about 0.1% to about 2.5%, and in other embodiments from about 0.15% to about 2% wt. % catalyst.

Thixatrope

In one or more embodiments, the adhesive compositions of the invention include at least 0%, in other embodiments at least 0%, and in other embodiments at least 0% wt. % thixatrope. In these or other embodiments, the adhesive compositions of the invention include at most 6%, in other embodiments at most 5%, and in other embodiments at most 4% wt. % thixatrope. In one or more embodiments, the adhesive compositions of the invention include from about 0% to about 6%, in other embodiments from about 0% to about 5%, and in other embodiments from about 0% to about 4% wt. % thixatrope.

Moisture Scavenger

In one or more embodiments, the adhesive compositions of the invention include at least 0.25%, in other embodiments at least 0.5%, and in other embodiments at least 0.75% wt. % moisture scavenger. In these or other embodiments, the adhesive compositions of the invention include at most 5%, in other embodiments at most 4%, and in other embodiments at most 3% wt. % moisture scavenger. In one or more embodiments, the adhesive compositions of the invention include from about 0.25% to about 5%, in other embodiments from about 0.5% to about 4%, and in other embodiments from about 0.75% to about 3% wt. % moisture scavenger.

Fillers

In one or more embodiments, the adhesive compositions of the invention include at least 0%, in other embodiments at least 0%, and in other embodiments at least 0% wt. % filler. In these or other embodiments, the adhesive compositions of the invention include at most 65%, in other embodiments at most 60%, and in other embodiments at most 55% wt. % filler. In one or more embodiments, the adhesive compositions of the invention include from about 0% to about 65%, in other embodiments from about 0% to about 60%, and in other embodiments from about 0% to about 55% wt. % filler.

Antioxidants

In one or more embodiments, the adhesive compositions of the invention include at least 0.1%, in other embodiments at least 0.15%, and in other embodiments at least 0.2% wt. % antioxidant. In these or other embodiments, the adhesive compositions of the invention include at most 3%, in other embodiments at most 2.5%, and in other embodiments at most 2% wt. % antioxidant. In one or more embodiments, the adhesive compositions of the invention include from about 0.1% to about 3%, in other embodiments from about 0.15% to about 2.5%, and in other embodiments from about 0.15% to about 2% wt. % antioxidant.

Plasticizer

In one or more embodiments, the adhesive compositions of the invention include at least 5%, in other embodiments at least 10%, and in other embodiments at least 15% wt. % plasticizer. In these or other embodiments, the adhesive compositions of the invention include at most 65%, in other embodiments at most 60%, and in other embodiments at most 55% wt. % plasticizer. In one or more embodiments, the adhesive compositions of the invention include from about 5% to about 65%, in other embodiments from about 10% to about 60%, and in other embodiments from about 15% to about 55% wt. % plasticizer.

Solvent

As discussed above, the adhesive compositions of the invention may advantageously be 100% solids compositions. In one or more embodiments, the compositions may be devoid of solvent. In these or other embodiments, the adhesive compositions are substantially devoid of solvents, which refers to that amount of solvent or less that will not have an appreciable impact on the composition. In one or more embodiments, the compositions of this invention include less than 10%, in other embodiments less than 8%, and in other embodiments less than 5% wt. % solvent.

Phenolic Resin

As discussed above, the adhesive compositions of the invention are devoid or substantially devoid of phenolic resin. In one or more embodiments, the compositions may be devoid of phenolic resin. In these or other embodiments, the adhesive compositions are substantially devoid of phenolic resin, which refers to that amount of solvent or less that will not have an appreciable impact on the composition. In one or more embodiments, the compositions of this invention include less than 3%, in other embodiments less than 2%, and in other embodiments less than 1% wt. % phenolic resin.

Preparation of Adhesive

The adhesive compositions of the present invention may be prepared by batch mixing using conventional batch mixing equipment. In one or more embodiments, the mixer may be equipped with an emulsifier. The mixing can take place under atmospheric pressure and at room temperature. The ingredients can conveniently be introduced to the mixer by first introducing the silane-terminate polymer followed by introduction of the other ingredients. Mixing may continue until desired viscosity or level of dispersion/solubility is achieved. In particular embodiments, mixing is conducted for at least 100 minutes, in other embodiments at least 150 minutes, in other embodiments at least 180 minutes, and in other embodiments at least 190 minutes The adhesive compositions of this invention may be formulated as either one-part or two-part compositions. In the case of one-part compositions, the composition is preferably free of water, and contains a moisture scavenger as discussed above. In the case of a two part composition that is combined at the point of use, one part may contain a small amount of water to initiate moisture curing and components that are not sensitive to moisture, whereas the other part may contain components that are sensitive to moisture such as adhesion promoters and more reactive polymers having silicon-containing hydrolyzable terminal groups.

Characteristics of Adhesive Composition

In one more embodiments, the adhesive composition is formulated to offer various characteristics that are advantageous in practicing the present invention.

The adhesive compositions of this invention when used to bond EPDM rubber sheet material to a high density particleboard have generally exhibited a peel strength of at least 2.5-4 pounds per linear inch (pli) after 30 day ambient cure. However, the thermosetting reactions in these compositions substantially improve with time and temperature. In one or more embodiments, after 30 days curing at 150 degrees Fahrenheit (normal rooftop conditions) peel strengths as high as 7.8 pli were obtained.

INDUSTRIAL APPLICABILITY

In particular embodiments, the adhesive may be employed in preparing a fully-adhered roofing membrane system. Practice of the present invention is not necessarily limited by the selection of a particular roofing membrane that is secured to a substrate on a roof surface. As is known in the art, numerous roofing membranes have been proposed in the art and several are used commercially including thermoset and thermoplastic roofing membranes. Commercially available thermoplastic roofing membranes may include polyvinyl chloride, or polyolefin copolymers. For example, thermoplastic olefin (TPO) membranes are available under the trade names UltraPly™, and ReflexEON™ (Firestone Building Products). Commercially available thermoset roofing membranes may include elastomeric copolymers such as ethylene-propylene-diene copolymer (EPDM) rubber and functionalized olefins such as chlorosulfonated polyethylene (CSPE). For example, EPDM membranes are available under the trade name RubberGard™, RubberGard Platinum™, RubberGard EcoWhite™, and RubberGard MAX™ (Firestone Building Products). Useful EPDM membrane is disclosed in, for example, U.S. Pat. Nos. 7,175,732, 6,502,360, 6,120,869, 5,849,133, 5,389,715, 4,810,565, 4,778,852, 4,732,925, and 4,657,958, which are incorporated herein by reference. EPDM membranes are commercially available from a number of sources; examples include those available under the tradenames RubberGard (Firestone Building Products) and SURE-SEAL (Carlisle SynTec).

In particular embodiments, EPDM membranes are employed. As is known in the art, EPDM membrane panels include vulcanized or cured rubber compositions. These compositions may include, in addition to the rubber that is ultimately vulcanized, fillers, processing oils, and other desired ingredients such as plasticizers, antidegradants, adhesive-enhancing promoters, etc., as well as vulcanizing agents such as sulfur or sulfur-donating compounds.

In one or more embodiments, the EPDM roofing panels have a thickness in accordance with ASTM D-4637-04. In one or more embodiments, the EPDM roofing panels have a thickness of at least 45 mil±10%, in other embodiments at least 60 mil±10%, and in other embodiments at least 90 mil±10%. In these or other embodiments, the EPDM roofing panels may have a thickness of less than 65 mil±10%, in other embodiments less than 80 mil±10%, and in other embodiments less than 110 mil±10%.

In other embodiments, the bond adhesive composition of the present invention is applied exclusively to the substrate (e.g. the roof or materials on the roof such as insulation board), and the membrane is subsequently positioned over the adhesive layer without application of the adhesive directly to the membrane.

Application Method

In one or more embodiments of this invention, an adhered roofing system is constructed by applying the adhesive composition to a roof substrate to form a layer of adhesive and then subsequently contacting a surface of an EPDM panel to the layer of adhesive disposed on the substrate. Advantageously, the process can be used to construct a roofing system meeting the standards of UL and Factory Mutual for wind uplift without the need for applying an adhesive directly to the EPDM panel being installed. Moreover, these standards can be met in the absence of a fleece or other backing material applied to the membrane.

The substrate to which the adhesive composition is applied may include a roof deck, which may include steel, concrete, and/or wood. In other embodiments, the adhesive composition may be applied to insulation materials, such as insulation boards and cover boards. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood, OSB and plywood, as well as gypsum. In yet other embodiments, the adhesive composition may be applied to existing membranes. These existing membranes may include cured rubber systems such as EPDM membranes or chlorosulfonated polyethylene, thermoplastic polymers systems such as TPO membranes or PVC membranes, or asphalt-based systems such as modified asphalt membranes and/or built roof systems. Advantageously, practice of the present invention provides adhesion to asphalt-based substrates by offering sufficient oil resistance, which is required to maintain sufficient adhesion to asphalt systems.

In one or more embodiments, the adhesive composition is applied to the substrate by dip and roll techniques, which are conventional in the art of applying adhesives to substrates and/or membrane panels. In other embodiments, the adhesive composition is applied to the substrate by spraying. In one or more embodiments, the spraying may be accomplished by using airless spray equipment or air-assisted spray equipment. In one or more embodiments, the adhesive composition is atomized during the spraying operation. Useful spraying equipment is known in the art, such as the spray equipment available from Graco and Garlock. In other embodiments, the adhesive can be applied by a power roller, where the adhesive is pumped to the roller head. Examples include power rollers as supplied by Garlock. In yet other embodiments, the adhesive can be applied by using a drop spreader, which generally includes gravity feeding of the adhesive from a mobile platform such as that sold under the tradename BetterSpreader (Roofmaster).

In one or more embodiments, time is permitted between the application of the adhesive composition and application of the EPDM panel. In one or more embodiments, this time provided is less than 1 hour, in other embodiments less than 30 minutes, in other embodiments less than 10 minutes, and in other embodiments less than 3 minutes. In one or more embodiments, the time provided is from 1 minute to 1 hour.

In one or more embodiments, the wet film applied to the membrane and/or the substrate can be at least 7 mils, in other embodiments at least 10 mils, in other embodiments at least 13 mils, and in other embodiments at least 15 mils thick (wet film thickness). In these or other embodiments, the wet film thickness on each of the respective layers may be less than 30 mils, in other embodiments less than 25 mils, in other embodiments less than 18 mils, and in other embodiments less than 15 mils thick (wet film thickness). It has advantageously been discovered that practice of the present invention allows for application of a thinner wet film than has been previously employed using conventional bond adhesives while achieving technologically useful bond adhesion. As a result, during use of the bond adhesive, the application rate can be reduced (i.e., less bond adhesive is needed per square foot, which translates into an increased application rate). For example, in one or more embodiments, technologically useful adhesion can be achieved at application rates of at least 50 square foot per gallon, in other embodiments at least 60 square foot per gallon, in other embodiments at least 70 square foot per gallon, in other embodiments at least 80 square foot per gallon, in other embodiments at least 90 square foot per gallon, and in other embodiments at least 100 square foot per gallon.

In one or more embodiments, the EPDM panel may be applied to the adhesive layer using several known techniques. For example, the EPDM panel may be unrolled on to the adhesive layer.

Roof Construction

Aspects of the invention may be understood with reference to the FIGURE, which shows membrane 10 adhered to substrate 12. The substrate may include one or more of a roof deck 14, an insulation layer 16, a coverboard 18, and an existing membrane 20. In other words, membrane 10 may be adhered to roof deck 14, insulation layer 16, coverboard 18, or existing membrane 20. Disposed between an adhering membrane 10 to substrate 12 is a layer 22 of adhesive, which layer may be continuous or substantially continuous between membrane 10 and substrate 12 (i.e. a fully-adhered system). In one or more embodiments, the adhesive layer covers at least 20%, in other embodiments at least 30%, in other embodiments at least 40%, and in other embodiments at least 50%, and in other embodiments at least 60% of the surface of the substrate. In these or other embodiments, the adhesive layer covers less than 90%, in other embodiments less than 75%, and in other embodiments less than 60% of the surface of the substrate. Notably absent from the construction of one or more embodiments is a fleece layer between membrane 10 and substrate 12. In other words, adhesive layer 22 is adhesively bonded directly to membrane 10.

In one or more embodiments, the bond between substrate 12 and membrane 10, which is formed by adhesive layer 22, can be quantified based upon standardized peel adhesion tests pursuant to ASTM D1876. In one or more embodiments, the bond between membrane 10 and substrate 12 exceeds at least 1 pli, in other embodiments at least 2 pli, and in other embodiments at least 2.5 pli. Advantageously, in one or more embodiments, the bond formed between membrane 10 and substrate 12 exceeds the pull strength limitations and/or tensile limitations of the substrate. In other words, the substrate fails under pull force (for example the facer pulls from the insulation or substrate boards) prior to the failure of adhesive layer 22.

Various modifications and alterations that do not depart from the scope and spirit of this invention will become apparent to those skilled in the art. This invention is not to be duly limited to the illustrative embodiments set forth herein.

What is claimed is:
1. An adhered membrane roof system comprising:
a roof substrate;
a polymeric membrane comprising EPDM; and
an adhesive layer disposed between the roof substrate and the polymeric membrane that is adhered directly to the polymeric membrane, where there is no fleece or other backing layer between the roof substrate and the polymeric membrane, said adhesive layer being formed from a bond adhesive composition comprising:
a polymer having a silicon-containing hydrolysable terminal group and from about 1 to about 30 wt. % of a $C_9$ aromatic hydrocarbon tackifying resin, where the bond adhesive composition is devoid of phenolic resin, where the hydrocarbon tackifying resin is characterized by a softening point of from 90 to about 140° C., and a number average molecular weight of from about 300 to about 3000 g/mole.
2. The roof system of claim 1, where the adhesive layer is a substantially continuous layer.
3. The roof system of claim 1, where the roof substrate is selected from the group consisting of a roof deck, an insulation layer, a coverboard, and a roof panel.
4. The roof system of claim 1, where the roof substrate includes an insulation board.
5. The roof system of claim 1, where the roof substrate includes a coverboard.
6. The roof system of claim 1, where the roof substrate includes a polymeric roof panel.
7. The roof system of claim 6, where the polymeric roof panel includes an asphalt-based roof panel.
8. The roof system of claim 1, where the bond adhesive composition further includes an adhesion promoter.
9. The roof system of claim 1, where the bond adhesive composition further includes a catalyst.
10. The roof system of claim 1, where the bond adhesive composition further includes a moisture scavenger.
11. The roof system of claim 1, where the bond adhesive composition further includes a thixotropic compound.
12. The roof system of claim 1, where the polymer having a silicon-containing hydrolyzable terminal group is a silane-terminated polymer.
13. The roof system of claim 1, where the polymer having a silicon-containing hydrolyzable terminal group is a silane-terminated polyether or a silane-terminated polyurethane polymer.
14. A method for forming an adhered membrane roof system, the method comprising:
applying a bond adhesive composition to a roof substrate to form an adhesive layer, where the bond adhesive composition includes a polymer having a silicon-containing hydrolyzable terminal group and from about 1 to about 30 wt. % of a $C_9$ aromatic hydrocarbon tackifying resin, where the bond adhesive composition is devoid of phenolic resin, where the hydrocarbon tackifying resin is characterized by a softening point of from 90 to about 140° C. and a number average molecular weight of from about 300 to about 3000 g/mole; and
applying a polymeric membrane comprising EPDM directly to the adhesive layer, where there is no fleece or other backing layer between the roof substrate and the polymeric membrane.
15. The method of claim 14, where the roof substrate is selected from the group consisting of a roof deck, an insulation layer, a coverboard, and a roof panel.
16. The roof system of claim 1, where the hydrocarbon tackifying resin is a low-softening point tackifier resin, and where the bond adhesive composition further comprises a high-softening point hydrocarbon tackifier resin characterized by a softening point of from about 120 to about 150° C.
17. The roof system of claim 1, where the bond adhesive composition includes at least 3 wt. % of the aromatic hydrocarbon tackifying resin.
18. The roof system of claim 1, where the weight average molecular weight of the aromatic hydrocarbon tackifying resin is from about 500 to about 6000 g/mole.
19. The roof system of claim 18, where the aromatic hydrocarbon tackifying resin is characterized by a softening point of from 95 to about 120° C.
20. The roof system of claim 19, where the glass transition temperature of the aromatic hydrocarbon tackifying resin is from about −40 to about 80° C.
21. The roof system of claim 1, where the amount of polymer having a silicon-containing hydrolysable terminal group is from about 25 wt. % to about 80 wt. %.
22. The roof system of claim 1, where the bond adhesive composition further comprises a plasticizer, an adhesion promoter, a catalyst, a thixotropic compound, and an antioxidant.
23. The method of claim 14, where the polymer having a silicon-containing hydrolyzable terminal group is a silane-terminated polymer.
24. The method of claim 14, where the polymer having a silicon-containing hydrolyzable terminal group is a silane-terminated polyether or a silane-terminated polyurethane polymer.
25. The method of claim 14, where the bond adhesive composition further comprises one or more components selected from the group consisting of catalysts, moisture scavengers, thixotropic compounds, plasticizers, and adhesion promoters.

26. The method of claim 14, where the hydrocarbon tackifying resin is a low-softening point tackifier resin, and where the bond adhesive composition further comprises a high-softening point hydrocarbon tackifier resin characterized by a softening point of from about 120 to about 150° C.

* * * * *